US012654586B2

(12) United States Patent
Gudapati

(10) Patent No.: US 12,654,586 B2
(45) Date of Patent: Jun. 16, 2026

(54) ROBUST VEHICLE SECUREMENT TECHNIQUES FOR VEHICLE-TO-EVERYTHING POWER GENERATION

(71) Applicant: FCA US LLC, Auburn Hills, MI (US)

(72) Inventor: Abhilash Gudapati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 323 days.

(21) Appl. No.: 18/182,451

(22) Filed: Mar. 13, 2023

(65) Prior Publication Data

US 2024/0308385 A1     Sep. 19, 2024

(51) Int. Cl.
| | |
|---|---|
| *B60L 55/00* | (2019.01) |
| *B60L 53/16* | (2019.01) |
| *B60R 25/06* | (2006.01) |
| *B60T 7/04* | (2006.01) |
| *G07C 9/00* | (2020.01) |

(52) U.S. Cl.
CPC .............. *B60L 55/00* (2019.02); *B60L 53/16* (2019.02); *B60R 25/06* (2013.01); *B60T 7/042* (2013.01); *G07C 9/00309* (2013.01)

(58) Field of Classification Search
CPC ..... B60L 55/00; B60L 53/16; G07C 9/00309; G07C 2009/00531; B60T 7/042; B60R 25/06; B60R 25/066
See application file for complete search history.

(56) References Cited

U.S. PATENT DOCUMENTS

| | | | | |
|---|---|---|---|---|
| 6,060,981 | A | 5/2000 | Landes | |
| 9,303,571 | B2 * | 4/2016 | Yu | .......................... B60K 6/485 |
| 9,423,019 | B2 * | 8/2016 | Albertson | ............... F16H 59/10 |
| 9,694,791 | B2 | 7/2017 | Kamo | |
| 9,809,205 | B2 | 11/2017 | Förster et al. | |
| 10,328,940 | B2 * | 6/2019 | Cikalo | ................... B60W 10/30 |
| 11,046,287 | B1 * | 6/2021 | Schafer | ................. B60R 25/007 |
| 2010/0320018 | A1 * | 12/2010 | Gwozdek | .............. B60W 10/08 |
| | | | | 180/65.27 |
| 2020/0108819 | A1 * | 4/2020 | Revach | ................. B60W 20/13 |
| 2023/0066439 | A1 | 3/2023 | Tabata et al. | |

FOREIGN PATENT DOCUMENTS

WO      WO-2013072471 A1 *   5/2013   ............. B60R 25/04

OTHER PUBLICATIONS

International Search Report and Written Opinion dated Jul. 4, 2024 for International Application No. PCT/US2024/019502, International Filing Date Mar. 12, 2024.

* cited by examiner

*Primary Examiner* — Anne Marie Antonucci
*Assistant Examiner* — Nicholas Patrick Langhorne
(74) *Attorney, Agent, or Firm* — Jeremy J. Klobucar

(57)                ABSTRACT

A securement technique for a vehicle for vehicle-to-everything (V2X) power generation includes receiving, from a transmission shifter, a requested state for the transmission from the park state where a park pawl is engaged and one or more non-park states where the park pawl is disengaged, detecting for a key fob associated with the vehicle, detecting, via a user interface device, a lock request associated with a power generation mode during which a powertrain of the vehicle is configured to operate in a generator mode and output electrical power, in response to the lock request, commanding an actuator to physically lock the shifter while the transmission is in the park state and the park pawl is engaged and when the key fob is not detected, keep the park pawl engaged without regard to a requested non-park state from the shifter.

18 Claims, 10 Drawing Sheets

260

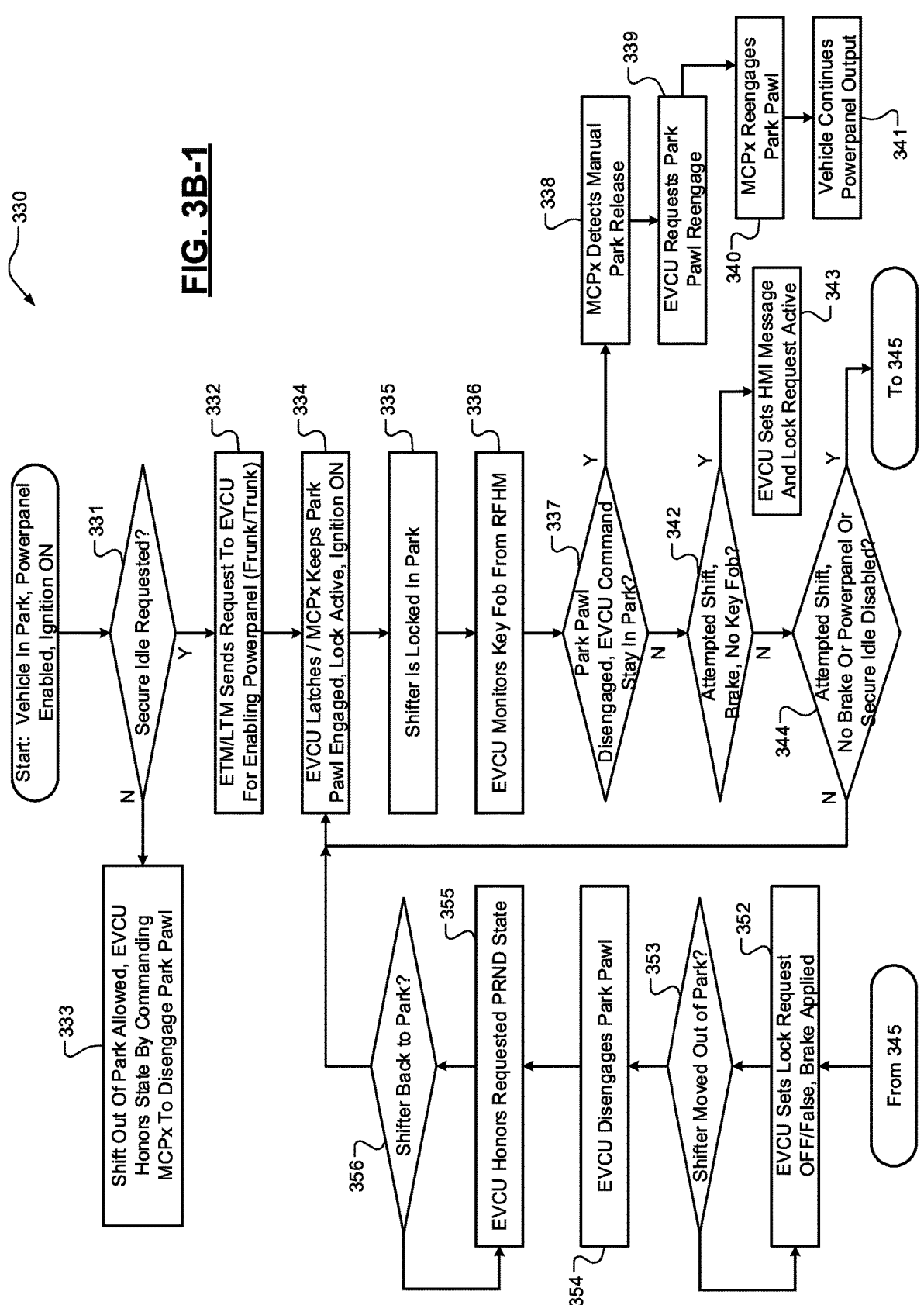

331
Secure Idle Requested?

Start: Vehicle In Park, Powerpanel Enabled, Ignition ON

333
Shift Out Of Park Allowed, EVCU Honors State By Commanding MCPx To Disengage Park Pawl 332
ETM/LTM Sends Request To EVCU For Enabling Powerpanel (Frunk/Trunk)

334
EVCU Latches / MCPx Keeps Park Pawl Engaged, Lock Active, Ignition ON

335
Shifter Is Locked In Park

336
EVCU Monitors Key Fob From RFHM

337
Park Pawl Disengaged, EVCU Command Stay In Park?

338
MCPx Detects Manual Park Release

339
EVCU Requests Park Pawl Reengage

340
MCPx Reengages Park Pawl

341
Vehicle Continues Powerpanel Output

342
Attempted Shift, Brake, No Key Fob?

343
EVCU Sets HMI Message And Lock Request Active

To 345

344
Attempted Shift, No Brake Or Powerpanel Or Secure Idle Disabled?

352
EVCU Sets Lock Request OFF/False, Brake Applied

From 345

353
Shifter Moved Out of Park?

354
EVCU Disengages Park Pawl

355
EVCU Honors Requested PRND State

356
Shifter Back to Park?

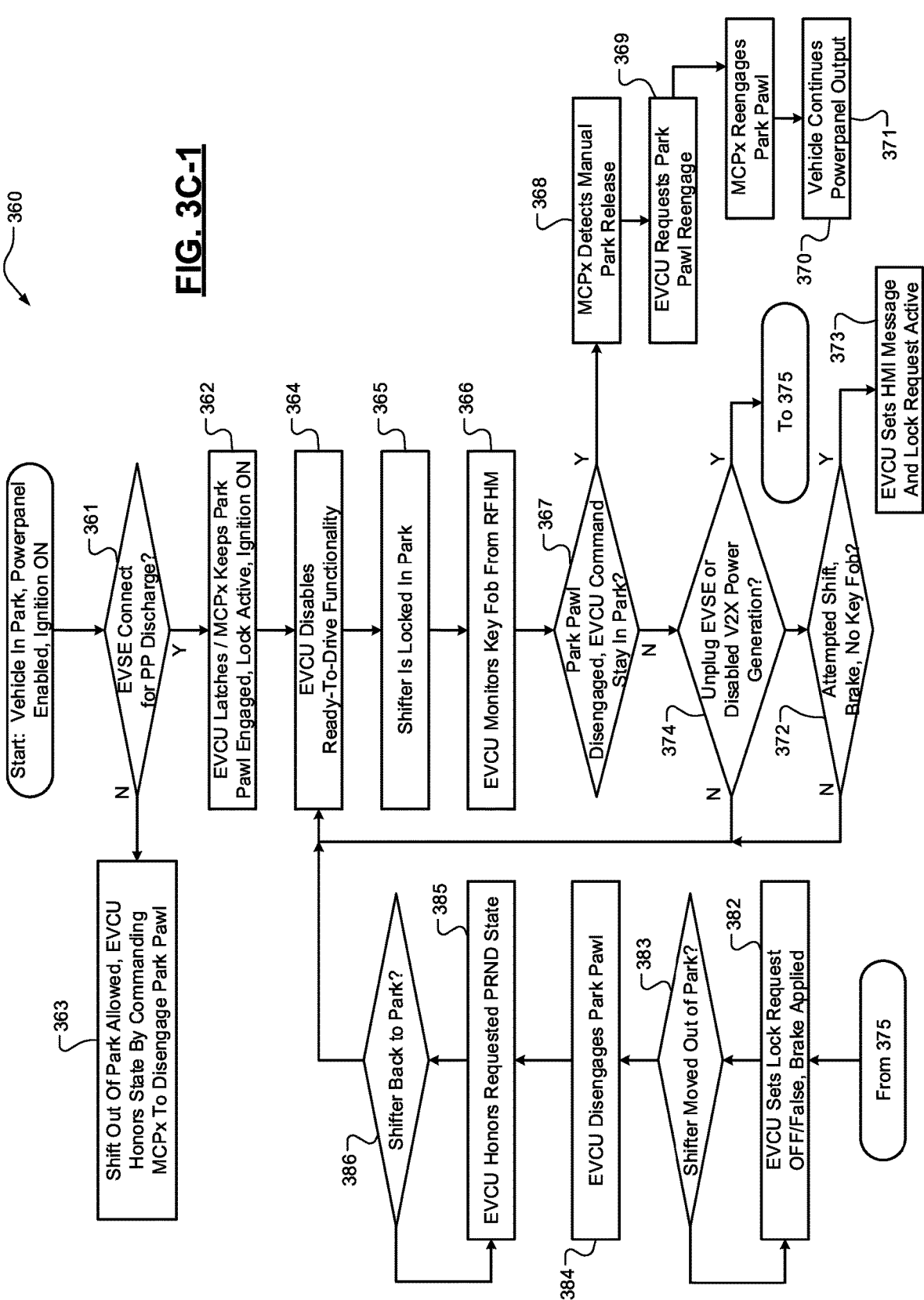

361 — EVSE Connect for PP Discharge?

363 — Shift Out Of Park Allowed, EVCU Honors State By Commanding MCPx To Disengage Park Pawl Start: Vehicle In Park, Powerpanel Enabled, Ignition ON 362 — EVCU Latches / MCPx Keeps Park Pawl Engaged, Lock Active, Ignition ON 364 — EVCU Disables Ready-To-Drive Functionality 365 — Shifter Is Locked In Park 366 — EVCU Monitors Key Fob From RFHM 367 — Park Pawl Disengaged, EVCU Command Stay In Park?

368 — MCPx Detects Manual Park Release

369 — EVCU Requests Park Pawl Reengage

MCPx Reengages Park Pawl

371 — Vehicle Continues Powerpanel Output

370

374 — Unplug EVSE or Disabled V2X Power Generation?

To 375

373 — EVCU Sets HMI Message And Lock Request Active

372 — Attempted Shift, Brake, No Key Fob?

From 375

382 — EVCU Sets Lock Request OFF/False, Brake Applied

383 — Shifter Moved Out of Park?

384 — EVCU Disengages Park Pawl

385 — EVCU Honors Requested PRND State

386 — Shifter Back to Park?

ROBUST VEHICLE SECUREMENT TECHNIQUES FOR VEHICLE-TO-EVERYTHING POWER GENERATION

FIELD

The present application generally relates to electrified vehicles and, more particularly, to robust vehicle securement techniques for vehicle-to-everything (V2X) power generation.

BACKGROUND

Electrified vehicles include one or more electric motors powered by a battery system and an optional internal combustion engine. In some applications, the electrified vehicles are configured such that their electric motors are operable as generators, thereby generating and outputting electrical power. Depending on the electrified vehicle configuration, this electrical power could be used, for example, to power a variety of external loads ranging from light loads (e.g., camping equipment) to heavy loads (e.g., a household). While the electrified vehicles are operating as generators as described, the owner/driver could leave the vehicle unattended. Because the electrified vehicles are on/powered-up, however, this creates a situation where the electrified vehicles are subject to theft. For example, an unauthorized individual could gain access to and then physically move the electrified vehicle, such as by actuating a manual park release. Accordingly, while such conventional electrified vehicles do work well for their intended purpose, there exists an opportunity for improvement in the relevant art.

SUMMARY

According to one example aspect of the invention, a securement system for a vehicle for vehicle-to-everything (V2X) power generation is presented. In one exemplary implementation, the securement system comprises a park pawl configured to engage/disengage to selectively lock a transmission of the vehicle in a park state, a controller configured to receive, from a shifter associated with the transmission, a requested state for the transmission from the park state where the park pawl is engaged and one or more non-park states where the park pawl is disengaged, wherein the controller is further configured to detect for a key fob associated with the vehicle, detect, via a user interface device, a lock request associated with a power generation mode during which a powertrain of the vehicle is configured to operate in a generator mode and output electrical power, in response to the lock request command an actuator to physically lock the shifter while the transmission is in the park state and the park pawl is engaged, and when the key fob is not detected, keep the park pawl engaged without regard to a requested non-park state from the shifter, and when the key fob is detected, disengage the park pawl in response to the requested non-park state from the shifter.

In some implementations, a presence of the key fob is continuously monitored for through controller area network (CAN) signals instead of multiple key fob search requests thereby avoiding draining of a low voltage battery of the key fob. In some implementations, the vehicle is an electrified vehicle having an electrified powertrain including one or more electric motors. In some implementations, the electrified vehicle is a plug-in hybrid vehicle (PHEV) and the user interface device is a charging plug that selectively connects the electrified vehicle to an external charging station, and wherein the lock request is generated in response to connecting the charging plug to the external charging station. In some implementations, drive-ready functionality of the electrified vehicle is temporarily disabled while the charging plug is connected to the external charging station and, when the charging plug is subsequently disconnected from the charging station, operation in the generator mode is ceased and drive-ready functionality resumes provided that the key fob is detected.

In some implementations, the vehicle is a mild hybrid vehicle having an internal combustion engine and a belt-driven starter generator (BSG) unit. In some implementations, a manual park release system is configured to disengage the park pawl even when the key fob is not detected. In some implementations, the shifter associated with the transmission is configured to blink based on the presence of the key fob and the requested state of the shifter. In some implementations, the controller is further configured to output a notification indicative of a drive-ready status to a mobile device associated with an operator of the vehicle.

According to another example aspect of the invention, securement method for a vehicle for V2X power generation is presented. In one exemplary implementation, the securement method includes receiving, by a controller of the vehicle and from a shifter associated with a transmission of the vehicle, a requested state for the transmission from a park state where a park pawl of the vehicle is engaged and one or more non-park states where the park pawl is disengaged, wherein the park pawl is configured to engage/disengage to selectively lock the transmission in the park state, detecting, by the controller, for a key fob associated with the vehicle, detecting, by the controller and via a user interface device of the vehicle, a lock request associated with a power generation mode during which an electrified powertrain of the vehicle is configured to operate in a generator mode and output electrical power, in response to the lock request, commanding, by the controller, an actuator to physically lock the shifter while the transmission is in the park state and the park pawl is engaged, and when the key fob is not detected, keeping, by the controller, the park pawl engaged without regard to a requested non-park state from the shifter, and when the key fob is detected, disengaging, by the controller, the park pawl in response to the requested non-park state from the shifter.

In some implementations, a presence of the key fob is continuously monitored for through controller area network (CAN) signals instead of multiple key fob search requests thereby avoiding draining of a low voltage battery of the key fob. In some implementations, the vehicle is an electrified vehicle having an electrified powertrain including one or more electric motors. In some implementations, the electrified vehicle is a plug-in hybrid vehicle (PHEV) and the user interface device is a charging plug that selectively connects the electrified vehicle to an external charging station, and wherein the lock request is generated in response to connecting the charging plug to the external charging station. In some implementations, drive-ready functionality of the electrified vehicle is temporarily disabled while the charging plug is connected to the external charging station and, when the charging plug is subsequently disconnected from the charging station, operation in the generator mode is ceased and drive-ready functionality resumes provided that the key fob is detected.

In some implementations, the vehicle is a mild hybrid vehicle having an internal combustion engine and a belt-driven starter generator (BSG) unit. In some implementations, a manual park release system is configured to disengage the park pawl even when the key fob is not detected. In some implementations, the shifter associated with the transmission is configured to blink based on the presence of the key fob and the requested state of the shifter. In some implementations, the method further comprises outputting, from the controller and to a mobile device associated with an operator of the vehicle, a notification indicative of a drive-ready status.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIGS. 3A-1 to 3C-2 are flow diagrams of example electrified vehicle securement methods for V2X power generation according to the principles of the present application.

DESCRIPTION

Figure 1:
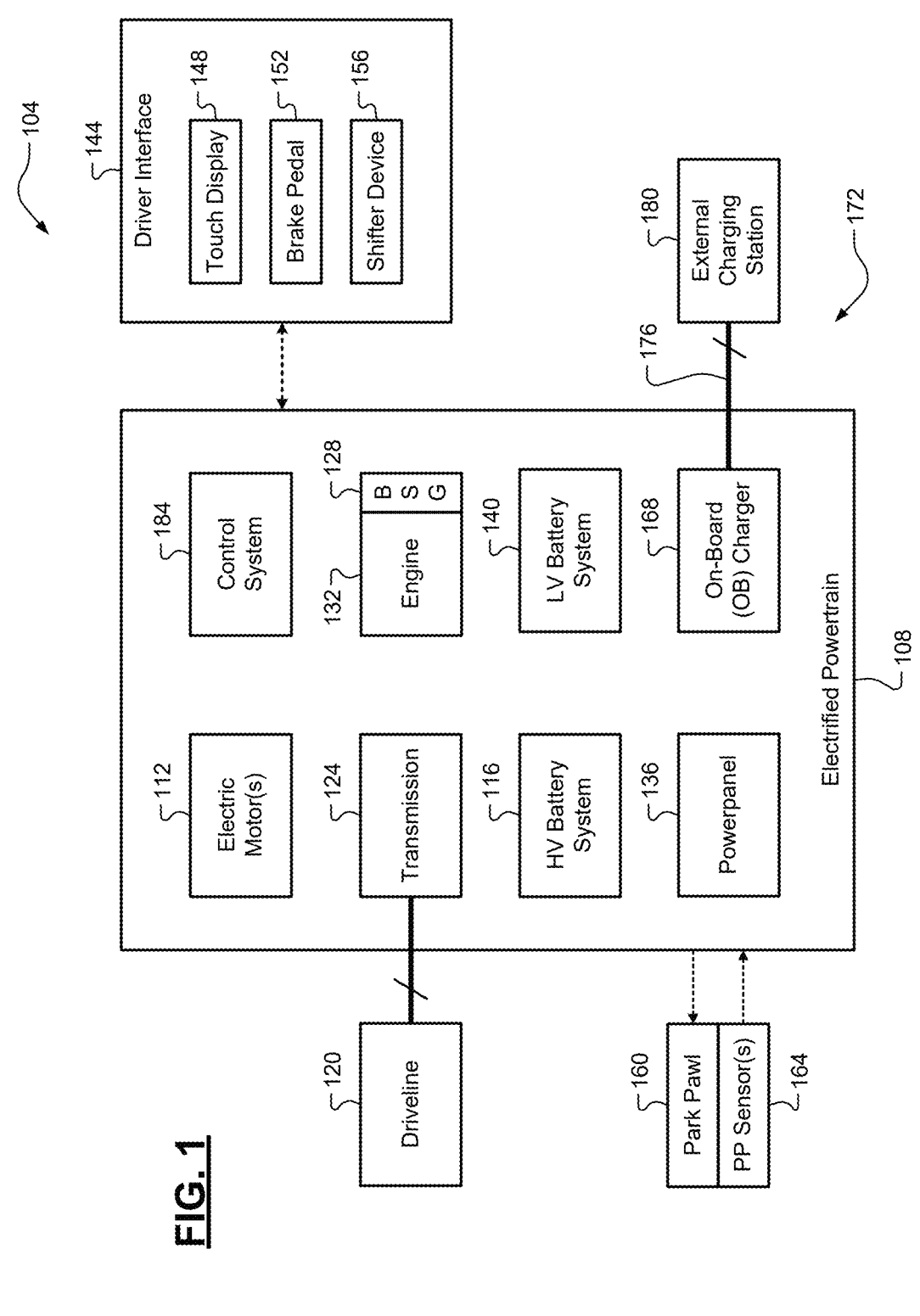
FIG. 1 is a functional block diagram of an electrified vehicle having an example securement system for vehicle-to-everything (V2X) power generation according to the principles of the present application.

As previously discussed, depending on an electrified vehicle's configuration, electrical power generated by and output therefrom could be used, for example, to power a variety of external loads ranging from light loads (e.g., camping equipment) to heavy loads (e.g., a household). While the electrified vehicles are operating as vehicle-to-everything (V2X) generators as described, the owner/driver could leave the vehicle unattended. Conventional solutions to this problem include locking the shifter in park, but this still subjects the electrified vehicle to possible theft.

Accordingly, robust vehicle securement techniques for V2X power generation are presented herein. During a power generation mode, a "powerpanel" of the electrified vehicle is configured to output electrical power for powering various external loads. These techniques are applicable to both conventional hybrid electric vehicles (HEVs) (e.g., mild hybrids, such as engines also having belt-driven starter generators, or BSGs) as well as plug-in hybrid electric vehicles (PHEVs) and fully electric battery electric vehicles (BEVs). These techniques utilize components other than the shifter to secure the electrified vehicle in park.

For mild hybrid/BSG vehicles, this is performed by a transmission controller (e.g., a transmission control module, or TCM), but a manual park release could still exist allowing manual unlocking from park. For PHEV/BEVs, other system controllers/modules are utilized to control the park pawl, including overriding/reengaging the park pawl if a manual park release system is present and actuated. In one new solution of the present application for mild hybrid powertrains (e.g., engine plus BSG unit), two layers of protection are provided: (i) if an operator manipulates the shifter or breaks the shifter to move it out of park to drive the vehicle away in the absence of key fob, and (ii) it also provides the customer with ample amount of human-machine interface (HMI) to ensure the operator correctly drives away in case of a mishap and ensures that the key fob is present in the vehicle before attempting to drive away. Conventional solutions to this same problem include disabling the engine so drive away is not possible. These conventional solutions, however, still allows the opportunity for the operator to shift out of park, if the shifter or its associated controller(s) are compromised.

In another new solution of the present application for high voltage electrified powertrains with a powerpanel having power outlet(s), even if the shifter/controller is compromised, the powerpanel does not stop functioning and the vehicle stays in park. This protects for broken/malfunctioning shifter/controller cases and the owner can still use the powerpanel. Another new solution of the present application for high voltage electrified powertrains that have electrified vehicle supply equipment (EVSE) based V2X power generation to provide four layers of protection: (i) disabling drive away capabilities for broken shifters, (ii) defeating theft through a manual park release system by re-engaging the park pawl after a discharge is requested and until the key fob is present, (iii) it also provides the customer with ample amount of HMI to ensure he/she correctly drives away in case of a mishap and (iv) ensures that the key fob is present in the vehicle before attempting to drive away. The conventional solutions to this problem as described above (e.g., locking the shifter in park) also do not protect for the manual park release system/feature.

Referring now to FIG. 1, a functional block diagram of an electrified vehicle 100 having an example securement system 104 for V2X power generation according to the principles of the present application is illustrated. While the techniques of the present application are described with specific reference to electrified vehicles, it will be appreciated that these techniques could also be applicable to conventional engine-based vehicles. The electrified vehicle 100 comprises an electrified powertrain 108 comprising one or more electric motors 112 powered by a high voltage (HV) battery system 116 to generate drive torque. This drive torque could be transferred to a driveline 120 via an automatic transmission 124 for vehicle propulsion, or could be utilized in other ways, such as for powering an optional BSG unit 128 associated with an optional internal combustion engine 132 or for generating electrical power for V2X output (e.g., via a powerpanel 136 having a set of power outlets) and/or for recharging the high voltage battery systems 116 and/or a low voltage ("LV," e.g., 12 volt) battery system 140. A driver interface 144 is configured for drive input/output and could include, for example, a touch display 148 or other HMI device, a brake pedal 152, and a shifter device 156 for selecting, for example, states from park, reverse, neutral, and drive (PRND).

Figure 2A:
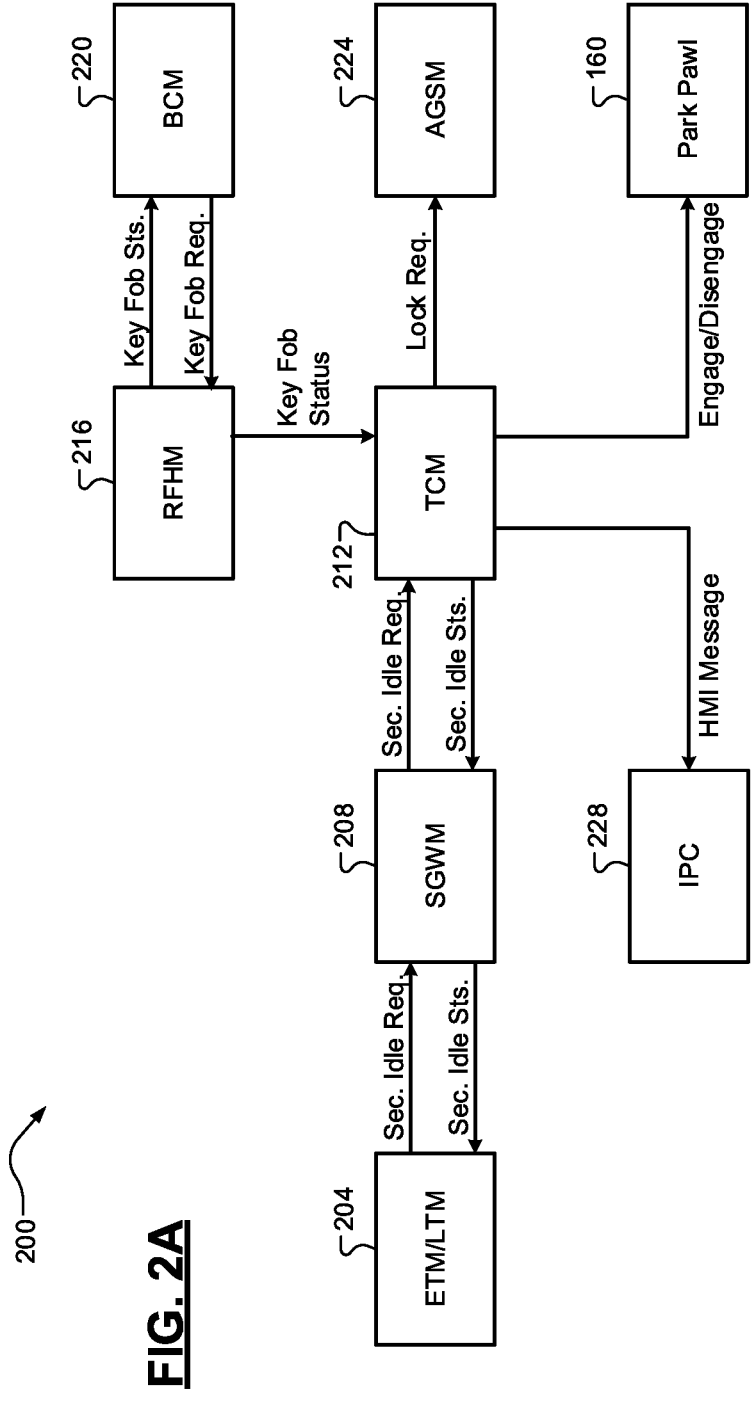
FIGS. 2A to 2C are functional block diagrams of example securement system architectures for V2X power generation according to the principles of the present application.
Figure 2B:
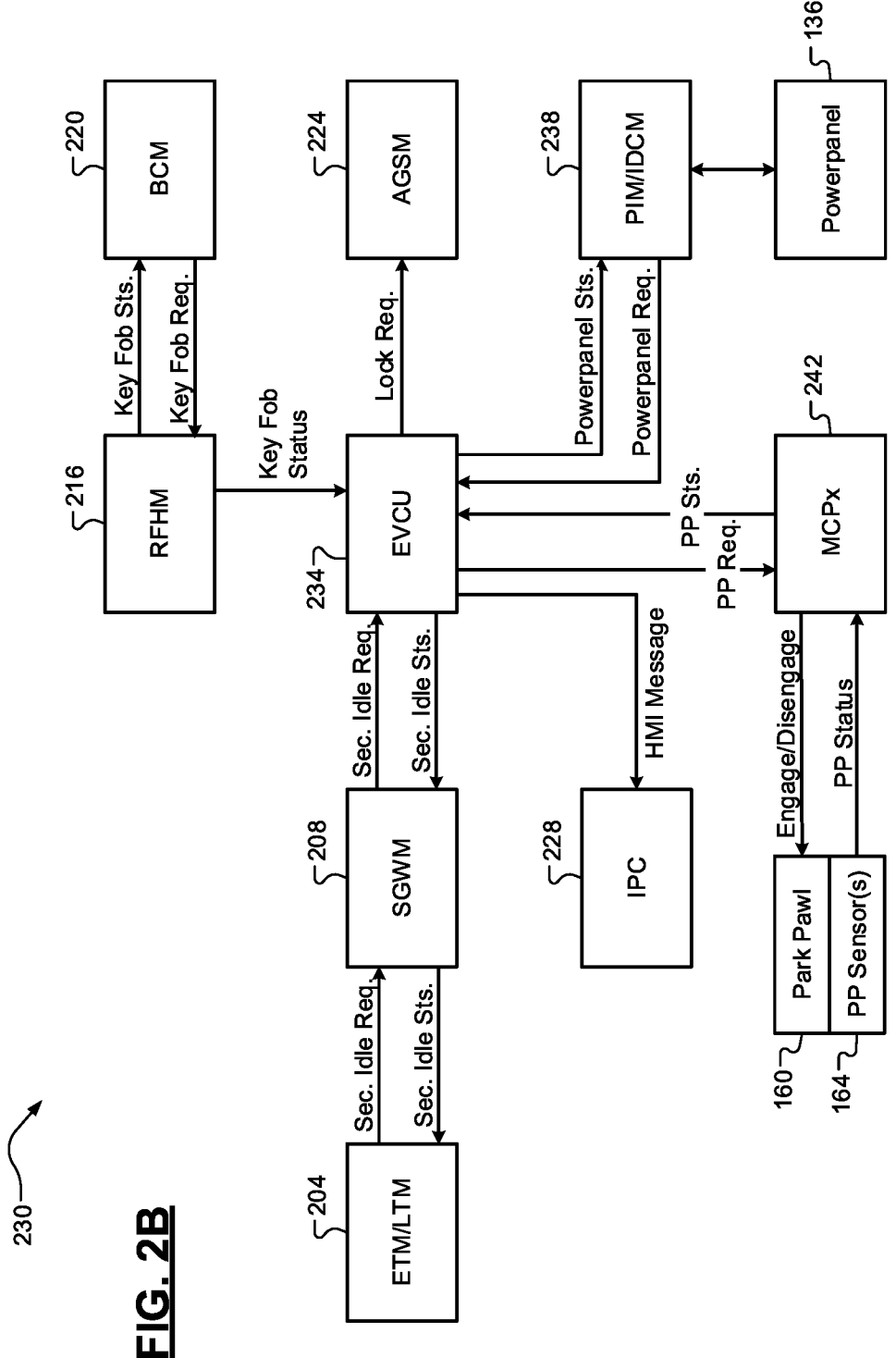
Figure 2C:
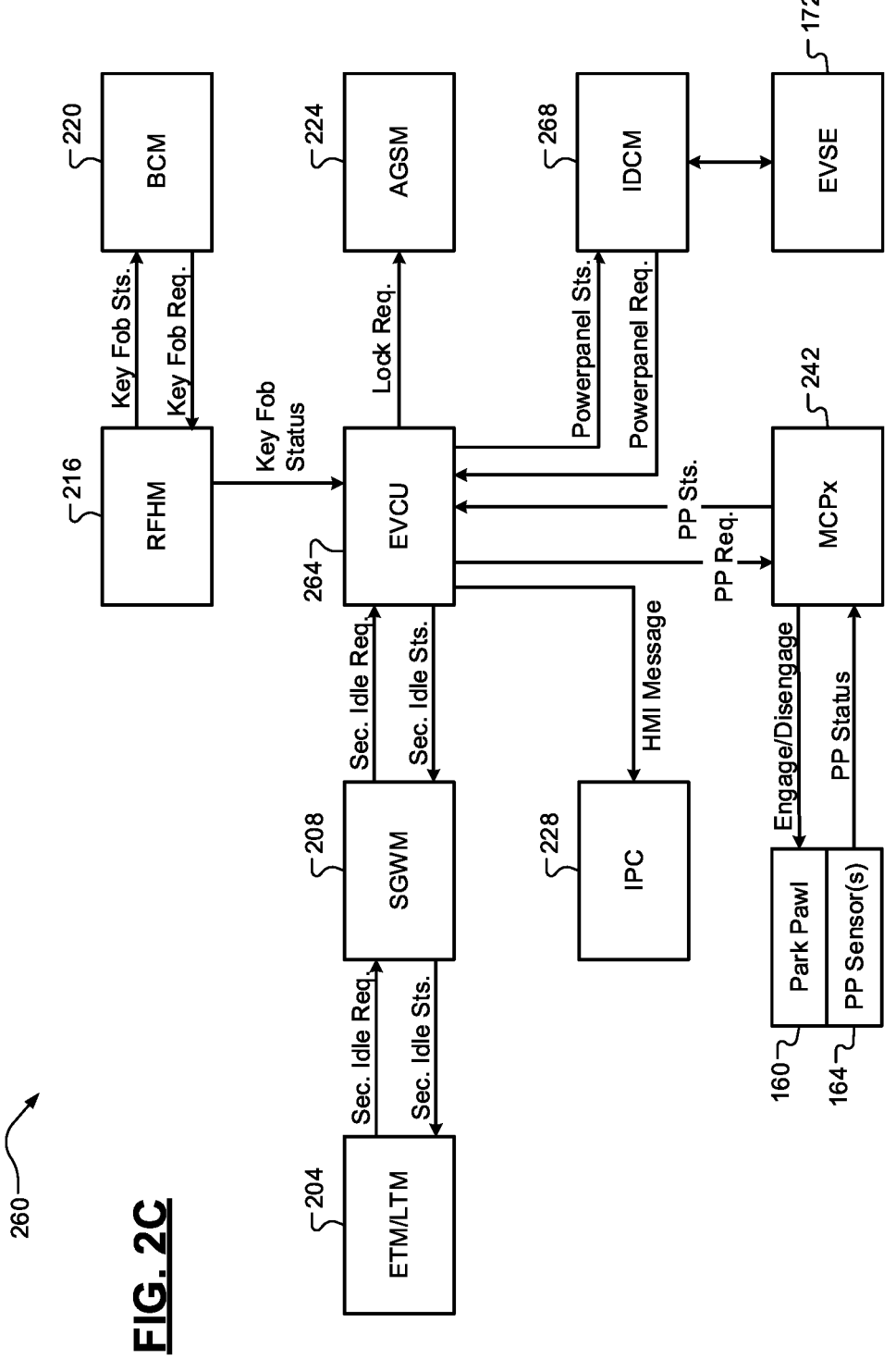

A park pawl 160 is configured to selectively engage/disengage to physically lock up the transmission 124 and the driveline 120. Optional park pawl (PP) sensor(s) 164 monitor a status/position of the park pawl 160. An optional on-board (OB) charger system 168 could also be provided to selectively connect to a charging cord/cable 176 of an external charging station 180, which are also collectively referred to as EVSE 172. A control system 184 is configured to, among other functions, control operation of the electrified vehicle 100 and its electrified powertrain 108, which is described in greater detail below. FIGS. 2A-2C illustrated example securement system architectures for various electrified vehicle powertrain configurations, including the various modules/devices and their communication lines/connections on a vehicle controller area network (CAN). These components include at least some of a telematic module (ETM/LTM), a secure gateway module (SGWM), a TCM, an electrified vehicle control unit (EVCU), a micro control processor (MCPx), an instrument panel cluster (IPC), a radio frequency hub module (RFHM), a body control module (BCM), an automatic gear shifter module (AGSM), an integrated dual charging module (IDCM) or power panel inverter module (PIM or PPIM).

Referring now to FIGS. 2A, 3A-1, and 3A-2, a first example electrified vehicle securement system architecture 200 and a corresponding first example electrified vehicle securement method 300 are illustrated. This system design for conventional and mild hybrid vehicles (e.g., BSG units) uses the TCM 212, which is the supervisor of park pawl system management as the primary source of securing the vehicle 100 in park rather than just locking the shifter 156 in park. This case requires the engine 132 and vehicle 100 to be on. The securement is triggered by a customer selection on the touch display 148 (e.g., an infotainment head unit) of the vehicle for the secure idle state. Secure idle selection causes the vehicle 100 to stay in park during the usage of the powerpanel 136 (see steps 301-305). Once secure idle is selected, the customer can shift out of park (step 303) if the key fob is present and reengaging shifter 156 in park will cause the secure idle to be active again. The TCM 212 is the supervisor of the brake transmission shift interlock ("BTSI") to lock the shifter 156 in park.

This essentially provides two layers of protection. First, if an operator manipulates the shifter 156 or breaks the shifter 156 to move it out of park to drive the vehicle 100 away in the absence of key fob. Second, the key fob status is constantly monitored by the TCM 212 through CAN signals. No additional key fob requests are required to avoid key fob low voltage battery drain. The existing method for key fob search can be repurposed. In such a scenario that the key fob is not present and customer presses the brake pedal 152 (brake transmission shift interlock, or "BTSI" trigger), the TCM 212 will provide HMI "Key Fob not present" to the customer (see steps 306-309, steps 317-322). In such a case where operator moves the shifter 156 out of park with the key fob not being present, the shifter 156 could blink the selected state and could set a key fob not present HMI (see steps 310-313). In such a case where the shifter 156 is blinking with selected state and the key fob is reproduced within the vehicle perimeter, the TCM 212 could display "Shift to Park for Drivability" as it meets the conditions for drive away (see steps 315-316). It should be noted that this system design cannot avoid a manual park release system/feature as it is a physical method to shift out of park. Thus, there remains a possibility of freewheeling even with the robustness added, which is similar to the other implementations in previously known solutions.

Figures 1, 3A:
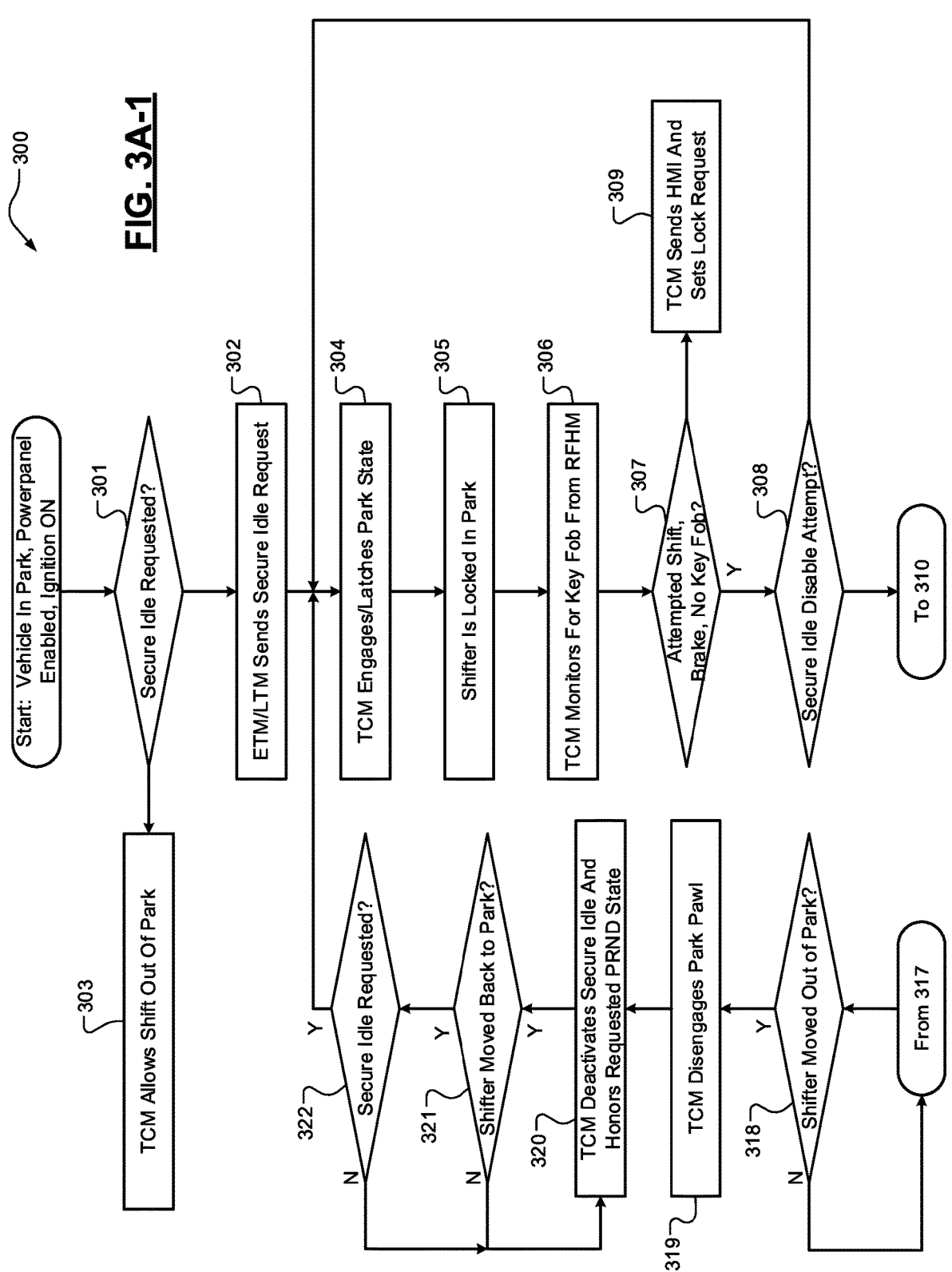
Figures 2, 3A:
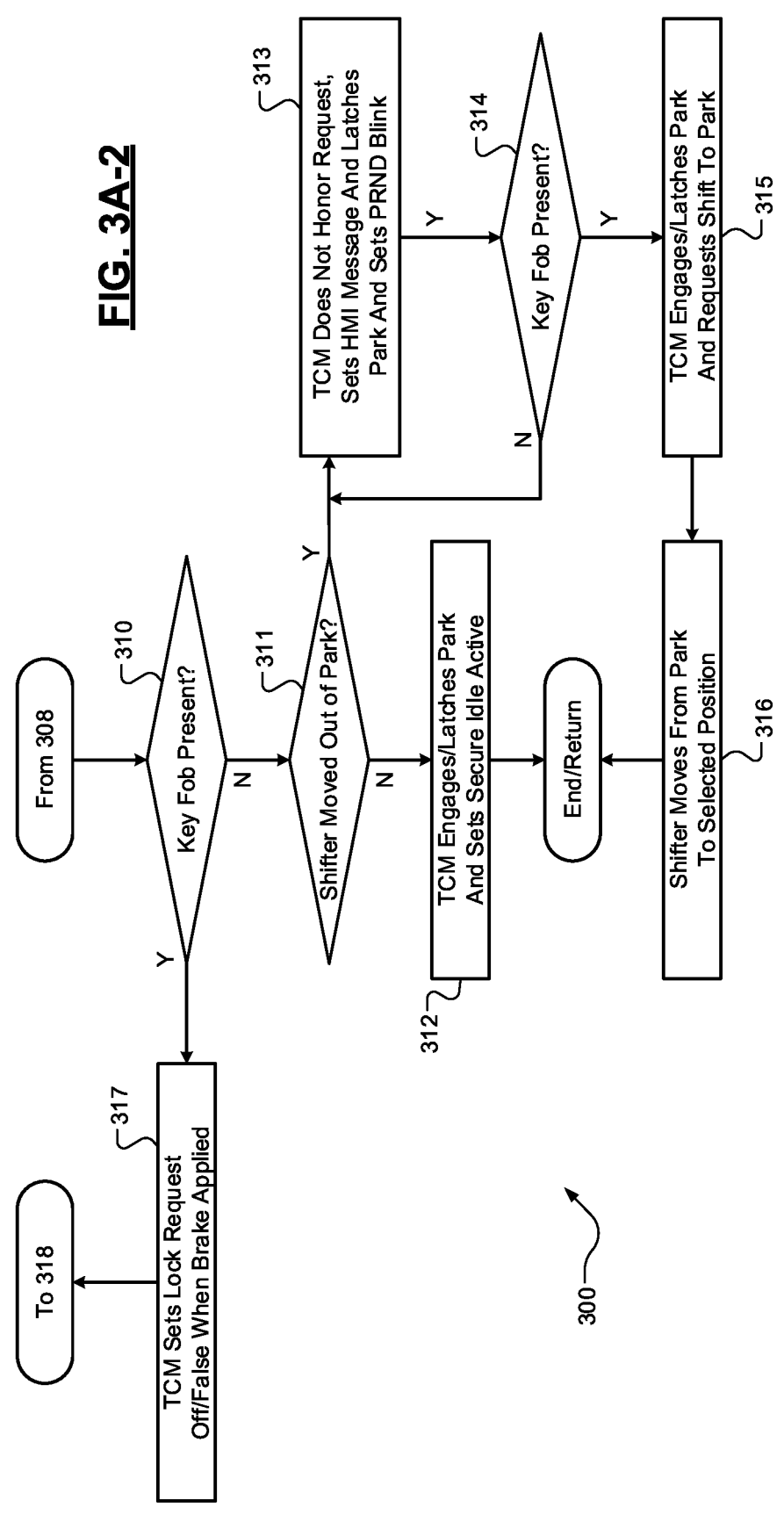
Figures 2, 3B:
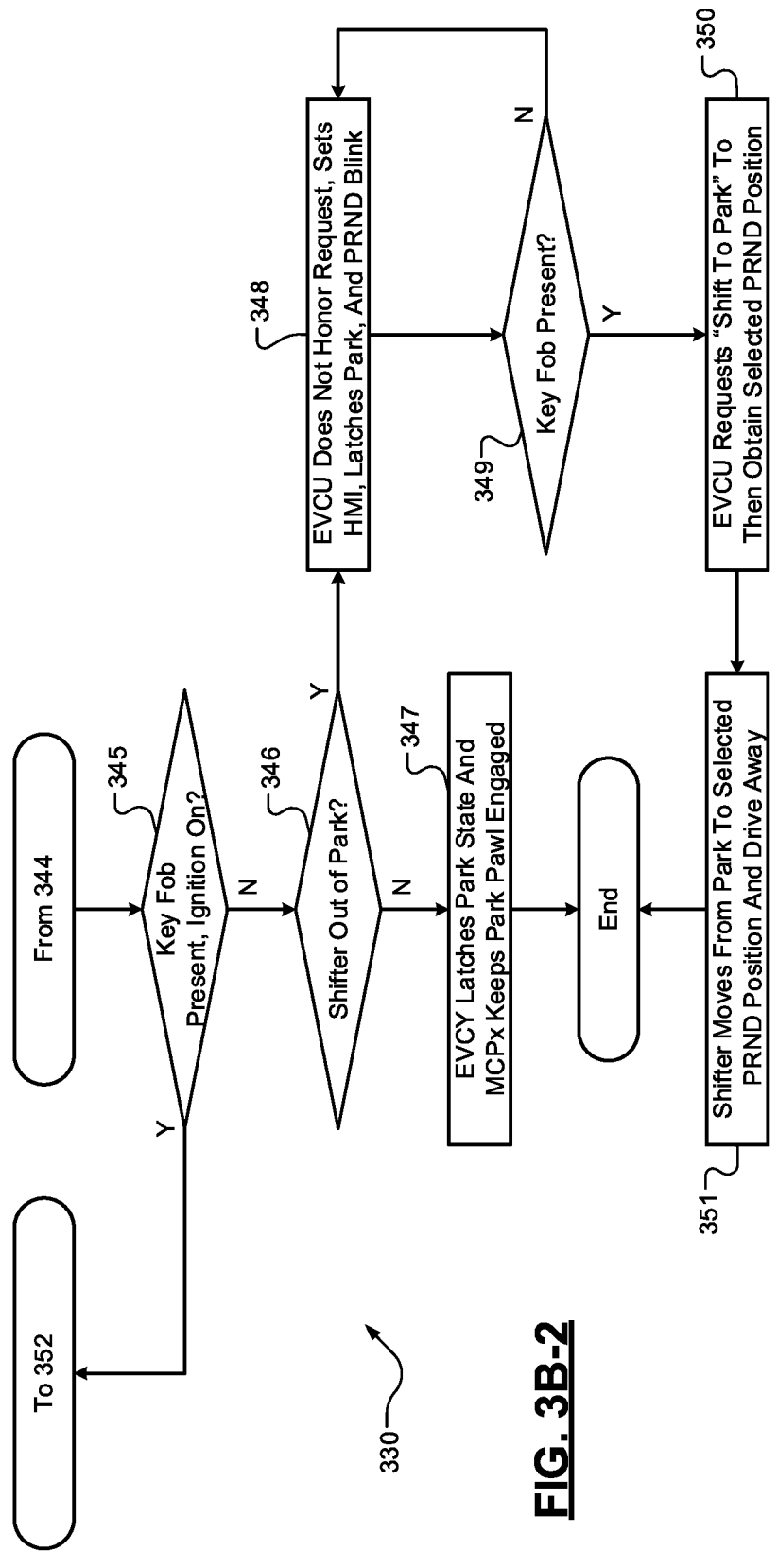

Referring now to FIGS. 2B and 3B, a second example electrified vehicle securement system architecture 230 and a corresponding second example electrified vehicle securement method 330 are illustrated. This system design uses an EVCU 234 or similar vehicle controller as supervisor of securement and an MCPx 242 as the supervisor of the park pawl. System management is the primary sources of securing the vehicle 100 in park rather than just locking the shifter 156 in park. The securement is triggered by a customer selection on the touch display 148 of the vehicle 100 for a powerpanel 136 discharge request and the EVCU 234 meeting conditions to discharge through the outlets. The EVCU 234 is the supervisor of the BTSI to lock the shifter 156 in park (see steps 331-335). The EVCU 234 also locks the shifter 156 in park once its internal securement conditions are met. Once the determination of securement has been met, the EVCU 234 latches the park state and sends a command for the MCPx 242 to stay in park. The EVCU 234 also disables the drive-ready functionality when the power-panel 136 enable conditions (verified by the EVCU 234 and from the PIM/IDCM 238 that connects to the powerpanel 136) are met. The MCPx 242 also determines if the park pawl 160 is manually released and notifies the EVCU 234, the EVCU 234 then commands the park pawl 160 to be reengaged and also notifies the customer, for example only, through flashing hazard lights and calibratable number of soundings of a horn (see steps 337-342).

There are essentially four layers of protection. First, if the operator manipulates the designed system in the absence of key fob. The key fob status is constantly monitored by the EVCU 234 through CAN signals, and no additional key fob requests are required to avoid key fob low voltage battery drain. The current method for key fob search is repurposed. In such a case that customer would like to drive the vehicle 100 with power outlets connected, the customer acceptance through HMI will trigger "Vehicle is Ready to Drive" as an HMI and ready. The customer will be able to shift out of park if the key fob is present in the vehicle 100 (see steps 352-356). In such a scenario, that the key fob is not present and customer presses the brake pedal 152 (BTSI trigger), the EVCU 234 could provide the HMI "Key Fob not present" to the customer. In such a case where operator moves the shifter 156 out of park with the key fob not being present, the shifter 156 could blink with the selected state. In such a case where the shifter 156 is blinking with the selected state and the key fob is reproduced within the vehicle perimeter, the EVCU 234 could display the HMI "Shift to Park for Drivability." Once the shifter 156 is moved to park, drive-ready functionality is enabled with "Vehicle is Ready to Drive" as the HMI and the customer will be able to drive away (see steps 344-351).

Figures 2, 3C:
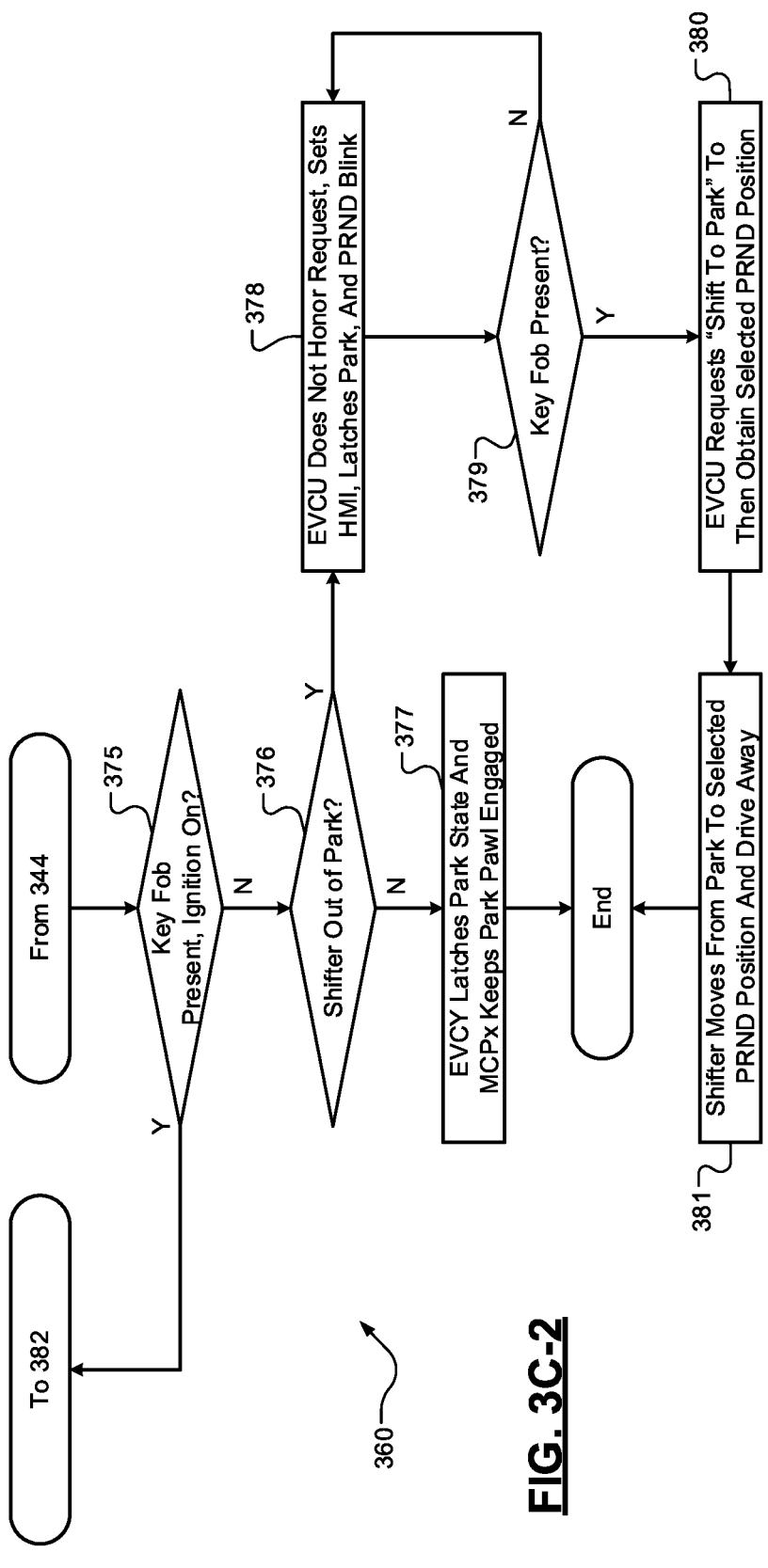

Referring now to FIGS. 2C and 3C, a second example electrified vehicle securement system architecture 260 and a corresponding first example electrified vehicle securement method 360 are illustrated. Lastly, this new solution for electrified vehicles (e.g., PHEVs) with V2X power generation through the EVSE 172 (e.g., charging station-vehicle cables/plugs) is presented. This system design uses an EVCU 264 or similar vehicle controller as supervisor of securement and the MCPx 242 as the supervisor of the park pawl 160. System management is the primary source of securing the vehicle 100 in park rather than just locking the shifter 156 in park. The securement is triggered by customer plugging-in the EVSE 172 equipment. The EVCU 264 also disables the drive-ready functionality when the EVSE 172 plug-in or connection is detected (via IDCM 268). The EVCU 264 is the supervisor of the BTSI to lock the shifter 156 in park. The EVCU 264 also locks the shifter 156 in park once its internal securement conditions are met. Once the determination of securement has been met, the EVCU 264 latches park state and sends a command for the MCPx 242 to stay in park (see steps 361-366). The MCPx 242 also determines if the park pawl is manually released and notifies the EVCU 264, the EVCU 264 then commands the park pawl 160 to be reengaged and also notifies the customer through flashing hazard lights and calibratable number of soundings of the horn (see steps 367-373). It will be appreciated that a customer notification could additionally or alternatively be provided, such as via a mobile device application.

There are again essentially four layers of protection, depending on whether the operator manipulates the designed system in the absence of key fob. The key fob status is constantly monitored by the EVCU 264 through CAN signals, and no additional key fob requests are required to avoid key fob low voltage battery drain. The current technique for key fob search is repurposed. In a first scenario that the customer unplugs the EVSE 172, the EVCU 264 will trigger "Vehicle is Ready to Drive" as an HMI and the customer will be able to shift out of park if the key fob is present in the vehicle 100. In a second scenario that the key fob is not present and the customer presses the brake pedal 152 (BTSI trigger), the EVCU 264 will provide the HMI "Key Fob not present" to the customer, if the EVSE 172 is unplugged. In a third scenario where operator moves the shifter 156 out of park with the key fob not being present, the shifter could blink the selected state. In a fourth scenario where the shifter 156 is blinking with selected state and the key fob is reproduced within the vehicle perimeter, the EVCU 264 could display "Shift to Park for Drivability." Once the shifter 156 is moved to park, drive-ready functionality is enabled with, for example, "Vehicle is Ready to Drive" as an HMI and the customer will be able to drive away (see steps 374-381, 382-386).

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A securement system for a vehicle for vehicle-to-everything (V2X) power generation, the securement system comprising:

a park pawl configured to engage/disengage to selectively lock a transmission of the vehicle in a park state;

a controller configured to receive, from a shifter associated with the transmission, a requested state for the transmission from the park state where the park pawl is engaged and one or more non-park states where the park pawl is disengaged, wherein the controller is further configured to:

detect for a key fob associated with the vehicle;

detect, via a user interface device, a lock request associated with a power generation mode during which a powertrain of the vehicle is configured to operate in a generator mode and output electrical power;

8 in response to the lock request, command an actuator to physically lock the shifter while the transmission is in the park state and the park pawl is engaged; and while operating the vehicle in the generator mode:

when the key fob is not detected:

keep the park pawl engaged in response to a requested non-park state from the shifter caused by a forced manual override or breakage of the actuator by an unauthorized operator, and keep the vehicle immobilized in response to an actuation of a manual park release system configured to disengage the park pawl; and when the key fob is detected, terminate the generator mode of the vehicle and disengage the park pawl in response to the requested non-park state from the shifter and enable a drive mode of the vehicle, wherein a presence of the key fob is continuously monitored for through controller area network (CAN) signals instead of multiple key fob search requests thereby avoiding draining of a low voltage battery of the key fob.

2. The securement system of claim 1, wherein the vehicle is an electrified vehicle having an electrified powertrain including one or more electric motors.

3. The securement system of claim 2, wherein the electrified vehicle is a plug-in hybrid vehicle (PHEV) and the user interface device is a charging plug that selectively connects the electrified vehicle to an external charging station, and wherein the lock request is generated in response to connecting the charging plug to the external charging station.

4. The securement system of claim 3, wherein drive-ready functionality of the electrified vehicle is temporarily disabled while the charging plug is connected to the external charging station and, when the charging plug is subsequently disconnected from the charging station, operation in the generator mode is ceased and drive-ready functionality resumes provided that the key fob is detected.

5. The securement system of claim 1, wherein the vehicle is a mild hybrid vehicle having an internal combustion engine and a belt-driven starter generator (BSG) unit.

6. The securement system of claim 1, wherein the shifter associated with the transmission is configured to blink based on the presence of the key fob and the requested state of the shifter.

7. The securement system of claim 1, wherein the controller is further configured to output a notification indicative of a drive-ready status to a human-machine interface (HMI) display of the vehicle or of a computing device associated with an operator of the vehicle.

8. The securement system of claim 1, wherein the controller is configured to, when the key fob is not detected, keep the vehicle immobilized in response to the actuation of the manual park release system by automatically reengaging the park pawl.

9. The securement system of claim 8, wherein the controller is further configured, when the key fob is not detected and in coordination with automatically reengaging the park pawl, actuate at least one of hazard lights of the vehicle and a horn of the vehicle a calibratable number of times.

10. A securement method for a vehicle for vehicle-to-everything (V2X) power generation, the securement method comprising:

receiving, by a controller of the vehicle and from a shifter associated with a transmission of the vehicle, a requested state for the transmission from a park state where a park pawl of the vehicle is engaged and one or more non-park states where the park pawl is disengaged, wherein the park pawl is configured to engage/disengage to selectively lock the transmission in the park state;

detecting, by the controller, for a key fob associated with the vehicle;

detecting, by the controller and via a user interface device of the vehicle, a lock request associated with a power generation mode during which an electrified powertrain of the vehicle is configured to operate in a generator mode and output electrical power;

in response to the lock request, commanding, by the controller, an actuator to physically lock the shifter while the transmission is in the park state and the park pawl is engaged; and while operating in the vehicle in the generator mode:

when the key fob is not detected:

keeping, by the controller, the park pawl engaged in response to a requested non-park state from the shifter caused by a forced manual override or breakage of the actuator by an unauthorized operator, and keeping, by the controller, the vehicle immobilized in response to an actuation of a manual park release system configured to disengage the park pawl; and when the key fob is detected, terminating, by the controller, the generator mode of the vehicle, disengaging, by the controller, the park pawl in response to the requested non-park state from the shifter, and enabling, by the controller, a drive mode of the vehicle, wherein a presence of the key fob is continuously monitored for through controller area network (CAN) signals instead of multiple key fob search requests thereby avoiding draining of a low voltage battery of the key fob.

11. The securement method of claim 10, wherein the vehicle is an electrified vehicle having an electrified powertrain including one or more electric motors.

12. The securement method of claim 11, wherein the electrified vehicle is a plug-in hybrid vehicle (PHEV) and the user interface device is a charging plug that selectively connects the electrified vehicle to an external charging station, and wherein the lock request is generated in response to connecting the charging plug to the external charging station.

13. The securement method of claim 12, wherein drive-ready functionality of the electrified vehicle is temporarily disabled while the charging plug is connected to the external charging station and, when the charging plug is subsequently disconnected from the charging station, operation in the generator mode is ceased and drive-ready functionality resumes provided that the key fob is detected.

14. The securement method of claim 10, wherein the vehicle is a mild hybrid vehicle having an internal combustion engine and a belt-driven starter generator (BSG) unit.

15. The securement method of claim 10, wherein the shifter associated with the transmission is configured to blink based on the presence of the key fob and the requested state of the shifter.

16. The securement method of claim 10, further comprising outputting, from the controller and to a human-machine interface (HMI) display of the vehicle or of a computing device associated with an operator of the vehicle, a notification indicative of a drive-ready status.

17. The securement method of claim 10, wherein when the key fob is not detected, keeping, by the controller, the vehicle immobilized in response to the actuation of the manual park release system is performed by automatically reengaging the park pawl.

18. The securement method of claim 17, further comprising when the key fob is not detected and in coordination with automatically reengaging the park pawl, actuating, by the controller, at least one of hazard lights of the vehicle and a horn of the vehicle a calibratable number of times.

* * * * *